United States Patent [19]

Wagner

[11] Patent Number: 4,598,548

[45] Date of Patent: Jul. 8, 1986

[54] VACUUM-OPERATED BRAKE BOOSTER

[75] Inventor: Wilfried Wagner, Hattersheim, Fed. Rep. of Germany

[73] Assignee: ITT Industries, Inc., New York, N.Y.

[21] Appl. No.: 560,810

[22] Filed: Dec. 13, 1983

[30] Foreign Application Priority Data

Dec. 13, 1982 [DE] Fed. Rep. of Germany ....... 3246085

[51] Int. Cl.⁴ .............................................. B60T 13/00
[52] U.S. Cl. ................................ 60/547.1; 91/369 A; 91/422
[58] Field of Search .................... 60/547.1; 91/369 A, 91/376 R, 422, 434; 251/61.1; 137/627.5

[56] References Cited

U.S. PATENT DOCUMENTS 3,452,646  7/1969  Abbott et al. ..................... 137/627.5
3,673,922  7/1972  Doyle ..................................... 91/422

FOREIGN PATENT DOCUMENTS 2053395  2/1981  United Kingdom ............. 91/369 A

Primary Examiner—Robert E. Garrett
Assistant Examiner—John M. Husar
Attorney, Agent, or Firm—James B. Raden; Donald J. Breh

[57] ABSTRACT

A vacuum-operated brake booster which includes a rolling diaphragm partly abutting against the diaphragm plate. The diaphragm has on its lateral surface close to the booster piston a sealing surface which cooperates both with a valve piston and the booster piston to govern the air flow from the atmosphere to the working chamber in front of the rolling diaphragm. The valve piston is moved by the tappet and with the slidable booster piston which controls the passage leading from the chamber behind the rolling diaphragm to the working chamber. The rolling diaphragm contains on its side remote from the booster piston an abutment surface which bears against a stop provided at the booster housing inner wall in the inactive position of the brake. Upon displacement of the valve piston in the actuating direction, the present booster arrangement generates instantaneously and without lost travel an output force which acts upon the master cylinder piston via the push rod.

9 Claims, 2 Drawing Figures

VACUUM-OPERATED BRAKE BOOSTER

BACKGROUND OF THE INVENTION

The present invention relates to a vacuum-operated brake booster of the type having a booster piston that is sealed in relation to the vacuum booster housing by a rolling diaphragm, and a tappet coupled to a brake pedal for the actuation of a double acting valve. By means of the double acting valve, a working chamber of the brake booster is alternatively connectible to vacuum or higher differential pressure. A first valve portion is formed by a valve seat at the booster piston and a sealing surface of sealing ring preloaded in the direction of the valve seat, while a second valve portion is formed by the same sealing ring and a valve piston connected with the tappet.

A vacuum booster of this general type is known (German printed and published patent application No. 29 42 416). In that patent, a booster piston subdivides the interior of a booster housing into a first working chamber, that is inwardly connected to a vacuum source, and into a second working chamber. A valve cylinder projects from the back side of the booster piston and contains, at its front side, a first annular valve seat with a valve piston being slidably arranged in the valve cylinder. The valve piston carries a second annular valve seat which is encompassed by the first valve seat and is coupled to a driving rod. The valve cylinder also receives a valve member which is urged by preloading against the first and the second valve seat. The first and the second working chamber establish communication through a gap between the first valve seat and the valve member upon retraction of the valve piston. On advance movement of the valve piston, the second working chamber is connected with the atmosphere via a space between the second valve seat and the valve member. Between the booster housing and the driving rod in this vacuum booster is a stop which confines the travel of retraction of the driving rod such that the distance between the first valve seat and the valve member is shorter in the inactive position of the driving rod than this distance is when the driving rod is to be retracted.

This known vacuum-operated brake booster has the disadvantage that, although the lost travel can be reduced until response of the device, it cannot be eliminated (for design reasons) since the tolerances of the individual components constituting the control, influence the lost travel with a view to preventing leakage of the device. Likewise, in other comparable known brake boosters, special arrangements make the valve piston approach the control housing sealing seat by about the "response lost travel".

SUMMARY OF THE INVENTION

It is, therefore, a major object of the present invention to provide a brake booster of the type mentioned, in which an output force is generated instanteously and without lost travel upon actuation, while improving the response time and the release time, relative to known boosters. The assembly of the brake booster is simplified to a particularly straight-forward design of the individual structural components of the brake booster.

This object is achieved by the present invention in that there is a rolling diaphragm which partly abuts against a diaphragm plate that engages a booster piston. The diaphragm includes a sealing surface on its side close to the booster piston which cooperates both with a valve piston that governs the air flow from the atmosphere to the working chamber in front of the rolling diaphragm and that is moved by the tappet. The slidable booster piston controls the passage from a chamber behind the rolling diaphragm to the working chamber. The rolling diaphragm contains in addition an abutment surface on its side remote from the booster piston which, in the brake's inactive position, abuts on a stop provided on the booster housing inner wall.

Preferably, the rolling diaphragm is of circular ring-shaped design to sealingly embrace a sliding sleeve which, together with the valve piston, is movable by the tappet and which is held and guided in an opening of the vacuum booster housing.

Further, a compression spring is clamped between the sliding sleeve and the rolling diaphragm which urges the sealing surface of the rolling diaphragm against the sealing valve seat at the booster piston and/or against the sealing seat at the valve piston.

Advantageously, the valve piston includes a collar which extends radially outwardly in the manner of a flange. The radially outwardly disposed annular portion of the piston forms the valve piston sealing seat which, in conjunction with the sealing surface of the rolling diaphragm, governs the air flow from the atmosphere to the working chamber.

To ensure that the valve piston slides back to its initial position upon completion of the braking action, the valve piston moved by the tappet is supported on the booster piston via a compression spring which urges the valve piston with its sealing seat against the sealing surface of the rolling diaphragm in the brake's inactive position.

In a preferred embodiment of this invention, in the area of the sealing surface, the rolling diaphragm enwraps a discoid reinforcing element which prevents the sealing surface from partly lifting off the booster piston sealings seat or from lifting off the sealing seat at the collar of the valve piston.

To safeguard the operability of the brake booster in the event of insufficient vacuum, the valve piston with the push rod is slidably by the tappet in a longitudinal direction. The piston is held and guided in the booster piston with its head portion remote from the tappet via a reaction member which is movable into abutment with the end face of the push rod to actuate the master cylinder piston.

In a particularly simple embodiment of the inventive booster, the valve piston which includes the collar and which is moved by the tappet is integrally designed with the sliding sleeve.

To prevent twisting of the rolling diaphragm in relation to the housing, the rolling diaphragm is provided in the area of channels formed in the surface of the booster piston with openings or perforations which align with the channels and have bead-like edges which extend into these channels.

BRIEF DESCRIPTION OF THE DRAWINGS

The present invention is illustrated schematically in the accompanying drawings which show one embodiment thereof. In the drawings.

DETAILED DESCRIPTION

Figure 1:
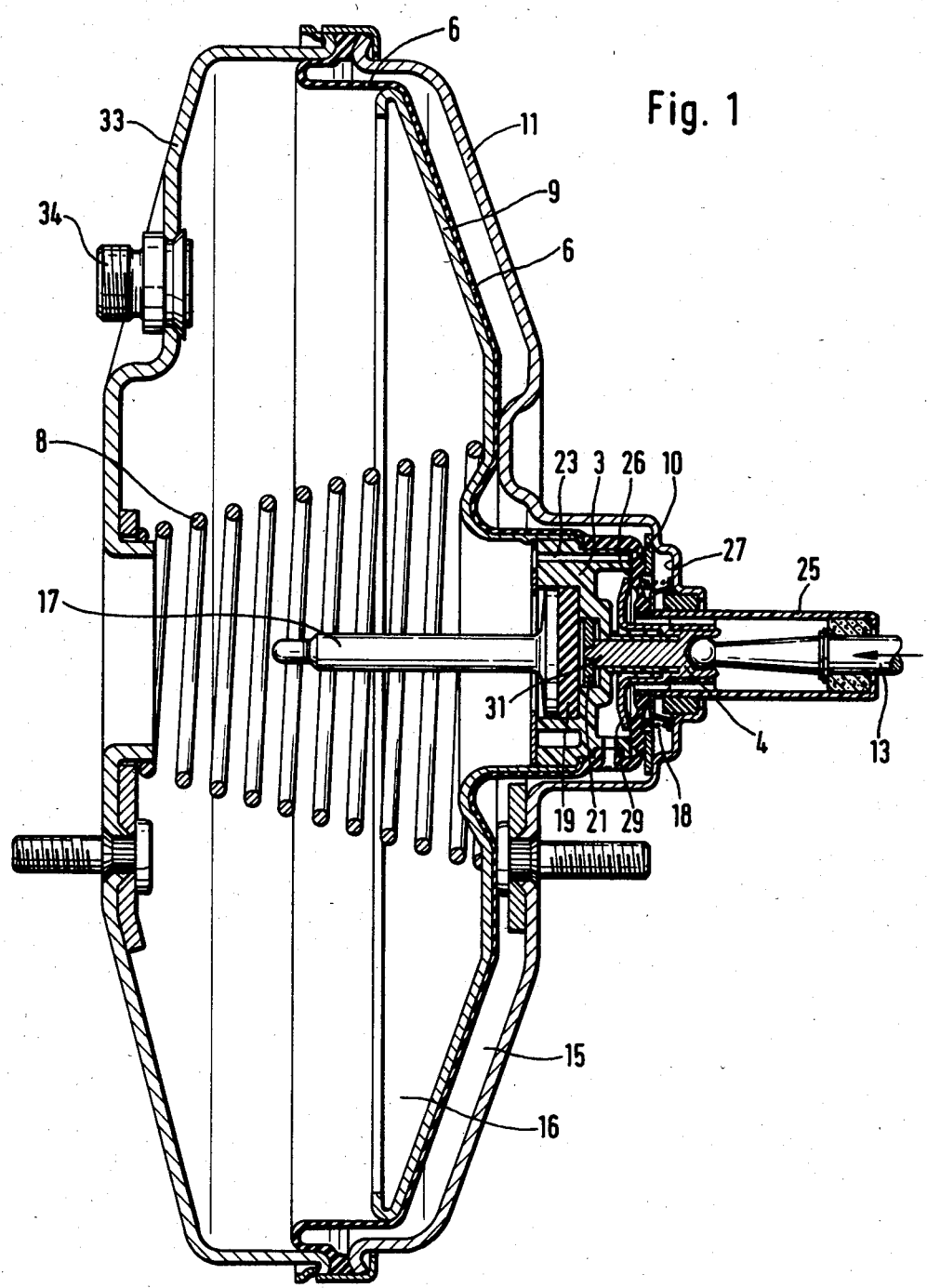
FIG. 1 is a longitudinal cross-section through a brake booster employing the present invention.

As is shown in FIG. 1, the brake booster is composed of the bipartite booster housing 11 and 33, the rolling diaphragm 6 subdividing the housing interior into the chambers 15 and 16, the diaphragm plate 9, the vacuum port 34, the return spring 8 cooperating with the master cylinder (not shown) and a control unit. The control unit is illustrated in detail in FIG. 2 in its relates position.

Figure 2:
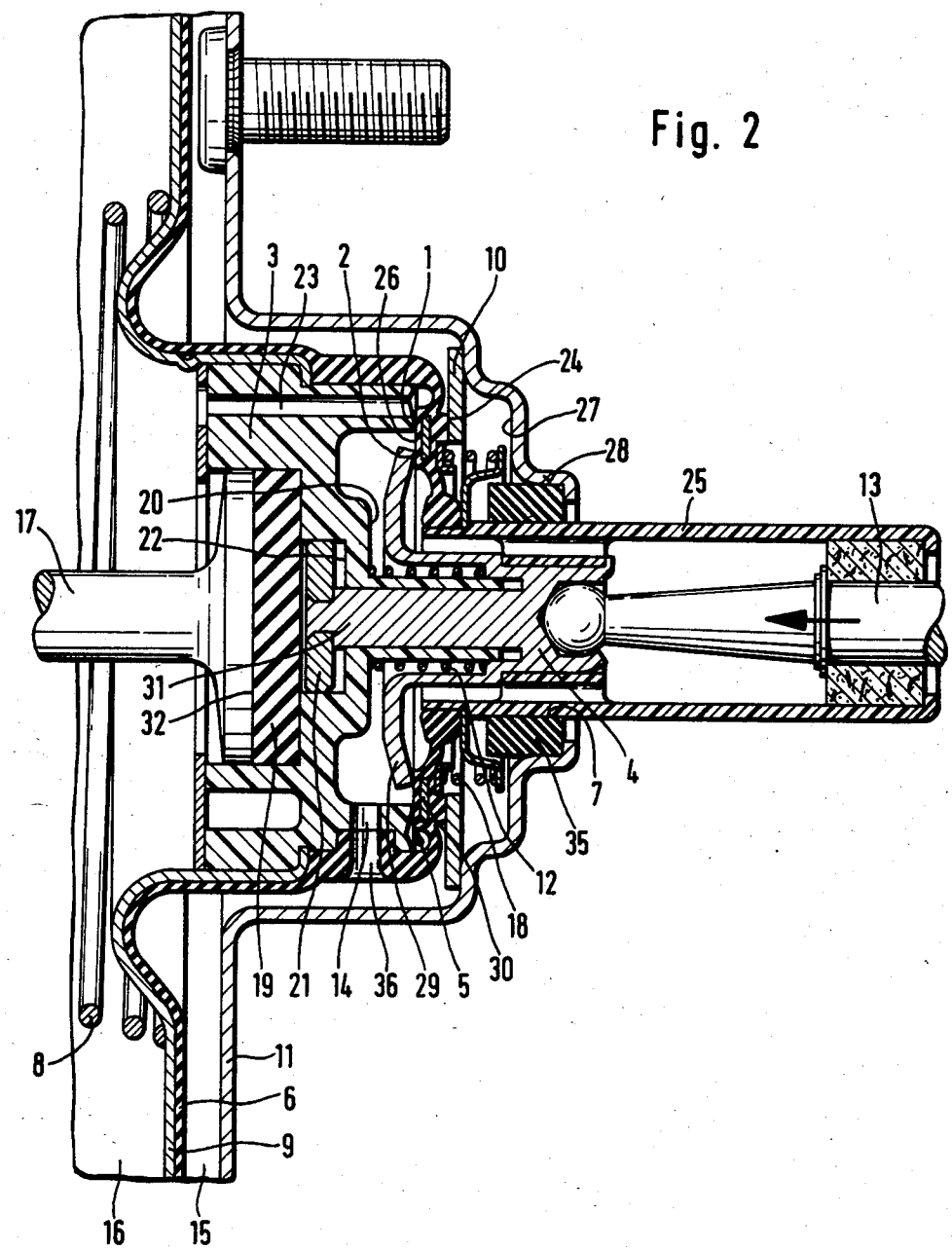
FIG. 2 is a partial view of the drive end of the booster of FIG. 1, on an enlarged scale.

Viewing FIG. 2, the return spring 8 urges the diaphragm plate 9 and, thereby, the booster piston 3 to bear against the poppet valve 5 and the sealing surface 26, respectively, via the control housing sealing seat 1. The spring 8 moves booster piston 3 via the stop washer 10, with stop 24, into abutment against the booster housing 11.

The tappet return spring 12 urges the valve piston 4 via the valve piston sealing seat 2 into abutment with the poppet valve 5 and via the stop washer 10, with stop 24, into abutment with the booster housing 11.

Upon actuation of the tappet 13 in the direction of the arrow, the spring force of the tappet return spring 12 will be overcome and the valve piston sealing seat 2, without lost travel, will be opened at once. The spring force of the poppet valve spring 18 is now acting on the control housing sealing seat 1 and maintains it seal-tight. Atmosphere enters the pressure chamber 15 through the valve piston sealing seat 2 and the channel 14 and develops an output force at the push rod 17 as a result of the pressure difference relative to the chamber 16. The diaphragm plate 9 with the booster piston 3 moves in the direction of the arrow, and the sealings seats 1 and 2 assume the so-called "breather position". The transmission is adjusted by a reaction disc 19 which alternatively may be substituted by a lever mechanism. Upon attainment of the maximum boosting effect, the collar of valve piston 4 moves into abutment against the surface 20 of the booster piston 3, and the input force will be transmitted directly through this abutment. In this arrangement, the valve piston sealing seat 2 is completely opened.

When the device releases (i.e., when the input force ceases), the valve piston 4 will be urged back by the tappet return spring 12, until the disc 21 abuts on the stop 22 in the booster piston 3 (to achieve a better release time, this space can be chosen to be as large as desired without affecting the function). When returning, the valve piston 4 carries along the poppet valve 5 via the valve piston sealing seat 2 so that the control housing sealing 1 opens and the atmosphere can be sucked out of the chamber 15 through the channel 14, the control housing sealing seat 1 and the channel 23 into the chamber 16. The control housing sealing seat 1 remains open, until the booster piston 3 together with the valve piston 4 and the poppet valve 5 have returned to their initial position with piston 3 resting against stop 24. At this time, the control housing sealing seat 1 is urged to close by the return spring 8. The device has reassumed the release position and can be actuated anew without lost travel.

It should be noted that the sliding sleeve 25 and the valve piston 4 may be of integral design and that the sealing diameter of the sealing ring 35 with sliding sleeve sealing seat 7 may be chosen to be comparatively small, as a result of which the loss in surface which must be compensated for by the return spring 8 becomes smaller as well.

It should further be noted that the rolling diaphragm 6 is provided with openings or perforations 36 in the area of the channels 14, with the bead-like edges of these perforations 36 extending into the channels 14, thereby preventing the rolling diaphragm from twisting inadvertently in relation to the booster housing.

The forms of this invention illustrated and described herein are but preferred embodiments of these teachings in the forms currently preferred for manufacture. They are shown as illustrations of the inventive concepts, however, rather than by way of limitation, and it is pointed out that modifications and alterations may be indulged in within the scope of the appended claims.

What is claimed is:

1. A vacuum-operated brake booster comprising a booster piston sealed in relation to the vacuum booster housing by a rolling diaphragm, a tappet coupled to a brake pedal for the actuation of a double acting valve by means of which a working chamber of the brake booster is alternatively connectible to vacuum or higher differential pressure, wherein a first valve portion is formed by a valve seat at the booster piston and a sealing surface of a sealing ring preloaded in the direction of the valve seat, while a second valve portion is formed by said sealing ring and a valve piston connected with the tappet, the rolling diaphragm partly abuts against a diaphragm plate that engages the booster piston, the rolling diaphragm being of circular ring-shaped design and sealingly embracing a sliding sleeve which together with the valve piston is movable by the tappet and which is held and guided in an opening of the vacuum booster housing, the rolling diaphragm including said sealing surface on its side close to the booster piston cooperating with said valve piston to govern the air flow from the atmosphere to the working chamber in front of the rolling diaphragm when said piston is moved by the tappet and, further in which the slidable booster piston controls the passage from a chamber behind the rolling diaphragm to the working chamber, and wherein the rolling diaphragm contains an abutment surface on its side remote from the booster piston which, the the brake's inactive position, abuts against a stop provided at the booster housing inner wall.

2. A vacuum-operated brake booster as claimed in claim 1, in which there is clamped between the sliding sleeve and the rolling diaphragm a compression spring which urges the sealing surface of the rolling diaphragm against the sealing valve seat at the booster piston and/or against the sealing seat at the valve piston.

3. A vacuum-operated brake booster as claimed in claim 1, in which the valve piston includes a collar which extends radially outwardly in the manner of a flange and whose radially outwardly disposed annular area forms the valve piston sealing seat which, in conjunction with the sealing surface of the rolling diaphragm governs the air flow from the atmosphere to the working chamber.

4. A vacuum-operated brake booster as claimed in claim 1, in which the valve piston moved by the tappet is supported on the booster piston via a compression spring which urges the valve piston with its sealing seat against the sealing surface of the rolling diaphragm in the brake's inactive position.

5. A vacuum-operated brake booster as claimed in claim 3, in which the rolling diaphragm enwraps a discoid reinforcing element in the area of the sealing surface to prevent the sealing surface from partly lifting off the booster piston sealing seat or off the sealing seat at the collar of the valve piston.

6. A vacuum-operated brake booster as claim in claim 1, in which the valve piston which is held and guided in the booster piston is movable into abutment with the end face of the push rod which actuates the master cylinder piston and is thereby together with the push rod slidable by the tappet in the longitudinal direction.

7. A vacuum-operated brake booster as claimed in claim 3, in which the valve piston which includes the collar and which is moved by the tappet is integral with the sliding sleeve.

8. A vacuum-operated brake booster as claimed in claim 1, wherein the rolling diaphragm includes openings or perforations which align with channels formed in the surface of said booster piston to allow said air flow.

9. A vacuum-operated brake booster comprising a booster piston sealed in relation to a vacuum booster housing by a substantially circular ring-shaped rolling diaphragm including a circular, inner-peripheral edge slidingly embracing a sliding sleeve guided in an opening of the vacuum booster housing and which together with a valve piston is movable by a tappet coupled to a brake pedal for actuation of a double acting valve by means of which a working chamber of the brake booster is alternatively connected to vacuum or higher differential pressure, in that a first valve portion is formed by a valve seat at the booster piston and a sealing surface of a sealing ring portion of said rolling diaphragm, a second valve portion is formed by said sealing ring portion and said valve piston, a compression spring between said sliding sleeve and said rolling diaphragm at said sealing ring portion for preloading said sealing surface in the direction of said first and second valve seats, said rolling diaphragm partly abuts against a diaphragm plate that engages said booster piston, said rolling diaphragm including said sealing surface on its side adjacent said booster piston cooperating with said valve piston to govern the air flow from the atmosphere to the working chamber in front of the rolling diaphragm when said valve piston is moved by the tappet and, further, in which the slidable booster piston controls the passage from a chamber behind the rolling diaphragm to the working chamber, said rolling diaphragm includes an abutment surface on its side remote from the booster piston which, in the brake's inactive position, abuts against a step provided at the booster housing inner wall.

* * * * *